United States Patent [19]

Stone et al.

[11] Patent Number: 4,647,051
[45] Date of Patent: Mar. 3, 1987

[54] SUPPORT FOR A CHUCK

[75] Inventors: William S. Stone, East Jordan; Thomas M. Dittrich, Lake Leelaneau, both of Mich.

[73] Assignee: Sheffer Collet Company, Traverse City, Mich.

[21] Appl. No.: 730,755

[22] Filed: May 3, 1985

[51] Int. Cl.$^4$ .................. B23B 31/16; B23B 31/20; B23B 31/32

[52] U.S. Cl. .................. 279/1 D; 279/1 ME; 279/1 DA; 279/2 R; 279/119

[58] Field of Search ............. 279/1 R, 1 A, 1 D, 1 L, 279/1 DA, 1 ME, 2 R, 110, 119, 35, 36, 106; 409/219, 220

[56] References Cited

U.S. PATENT DOCUMENTS

| | | | |
|---|---|---|---|
| 2,670,215 | 2/1954 | Fishwick | 279/36 X |
| 3,216,733 | 11/1965 | Parker et al. | 279/2 R |
| 3,521,511 | 7/1970 | Deuring et al. | 279/1 ME |
| 4,206,932 | 6/1980 | Felker | 279/1 D |
| 4,550,922 | 11/1985 | Hall et al. | 279/119 |

FOREIGN PATENT DOCUMENTS

| | | | |
|---|---|---|---|
| 1065095 | 4/1967 | United Kingdom | 279/106 |
| 1355807 | 6/1974 | United Kingdom | 279/2 R |

Primary Examiner—Gil Weidenfeld
Assistant Examiner—Steven C. Bishop
Attorney, Agent, or Firm—Price, Heneveld, Cooper, DeWitt & Litton

[57] ABSTRACT

A system for holding workpieces during machining utilizes a support chuck which may be mounted on a machine tool such as a lathe or it may be mounted on a support adjacent the machine tool such as a turnaround or carrousel. The invention utilized an adapter plate constructed to be gripped by the support chuck. The adapter plate in turn mounts the chuck which actually holds the workpiece. The support chuck has means to clamp the adapter plate to it and to precisely center the plate and its workpiece gripping chuck concentrically of the support chuck. The adapter plate is so constructed that the chuck manipulation rods and pulls conventionally used with chucks or various types can pass through it to actuate the workpiece holding chuck.

22 Claims, 11 Drawing Figures

SUPPORT FOR A CHUCK

FIELD OF THE INVENTION

This invention relates to machine tools and more particularly to a means of quickly retooling a machine to adapt it from a workpiece of one design to a workpiece of another design and at the same time being able to maintain tolerances within very precise limits.

BACKGROUND OF THE INVENTION

Many systems and tools have been developed for supporting workpieces while they are being machined. These systems and tools have the common objective of holding the workpiece with sufficient accuracy that the machining satisfies the tolerence requirements for the particular part. The closer the tolerances, the greater the necessity for accurate positioning of the workpiece and the greater the necessity that the workpiece be held against deflection resulting from tool pressure. One approach to this problem has been the use of a jig on which the part is mounted. A jig support is provided at the tool to hold and locate the jig with respect to the tool. In many cases the jig with the workpiece secured to it is moved from machine to machine so that various machining operations can be performed on the workpiece. In many cases the jigs are expensive and their usefulness is limited to a part of a single design and size. Once the production run of the workpiece is finished, the jig has no further utility and is scrap. An example of this type of jig is disclosed in U.S. Pat. No. 2,176,089 issued Oct. 17, 1939 to F. J. Malone. The cost of this type of tooling coupled with its one-part utility limits the use of this type of tooling to parts requiring mass production.

An even more costly and specialized approach to the problem of holding workpieces for machining is disclosed in U.S. Pat. No. 2,392,169 issued Jan. 1, 1946, to J. H. Mansfield and U.S. Pat. No. 4,309,600 issued Jan. 5, 1982, to C. B. Perry et al. These involve the design of entire systems for multiple machining of parts. To change over systems of this type from one part design to another necessitates a long and costly rebuilding procedure. Thus, the system is useful only for mass produced products having long production runs whereby the cost of the system can be amortized.

Even with the investment in the foregoing systems, the problem of tolerance control remains. The systems are basically incapable of dependably controlling tolerances to less than 0.005 inches.

For the purpose of machining parts when only small quantities are needed, various types of workpiece holders have been developed. An example of this type of workpiece holder is disclosed in U.S. Pat. No. 4,184,669, issued Jan. 22, 1980 to H. Bald. While this type of workpiece holder can be adapted to mount parts of various designs, accurately positioning each workpiece is time consuming and requires both skill and experience. Thus, it is expensive to use. Further, it does not solve the problem of tolerance control.

In many cases a chuck or collet could be used as the workpiece support. This would significantly improve tolerance control. However, chucks and collets have a very limited range of adjustment for workpieces of different sizes, normally only a few tenths of an inch. Thus, the change over from one part to another involves replacing the chuck or collet to adapt the machine from one workpiece to another. This is a time consuming operation. Further, each time such a change is made the replacement chuck or collet, has to be checked for accuracy of mounting including concentricity with the tool itself. Normally, it also has to be checked for axial position. This is true whether the chuck is mounted for stationary or driven use. The result again is a time consuming and expensive operation. It is also an important cost factor that while the chucks or collets are being exchanged and its replacement checked for accuracy the machine on which mounting is done is out of production. These machines involve a very substantial capital investment. Therefore, their downtime is costly. This materially adds to the cost of the operation and has a material negative effect upon productivity.

BRIEF DESCRIPTION OF THE INVENTION

The invention provides a means and system to provide quick adaption or changeover of a machine tool from one machining requirement to another. Further, the invention not only does not sacrifice accuracy to accomplish its purpose, it improves it. This invention is equally effective whether the change involves the size or the type of chuck required. Other methods and equipment which have been devised to speed up this type of tooling change have provided for quick changes of the jaws and locators. None of these changes have accomplished changing of the type or style of the chuck being used. Yet, such a change is necessary to cover the spectrum of requirements encountered in most manufacturing processes.

The costly machine downtime and labor heretofore necessary for exchanging chucks or collets is eliminated. The invention provides a plate to which a chuck or collet is secured either permanently or detachably. The plate is provided with means whereby it can be quickly mounted on or removed from a supporting chuck. The plate includes means whereby the operating mechanism of the support chuck can be utilized to open and close the chuck or collet mounted on the plate. The plate and its support chuck are so constructed that the plate will automatically be accurately centered and axially positioned wirh respect to the support chuck. Thus, the act of gripping the plate with its support chuck automatically positions the plate and the workpiece without the necessity for any adjustments or accuracy checks. All of the accuracy checks and adjustments will have been taken care of at a separate service station or module where the workpiece clamping chuck was initially mounted on the plate. The downtime for the tool itself will be only that necessary to mount the plate on the support chuck. Further, the invention is such that the change from one chuck to another can be accomplished manually or entirely by a robot.

DESCRIPTION OF THE PREFERRED EMBODIMENT

Figure 2:
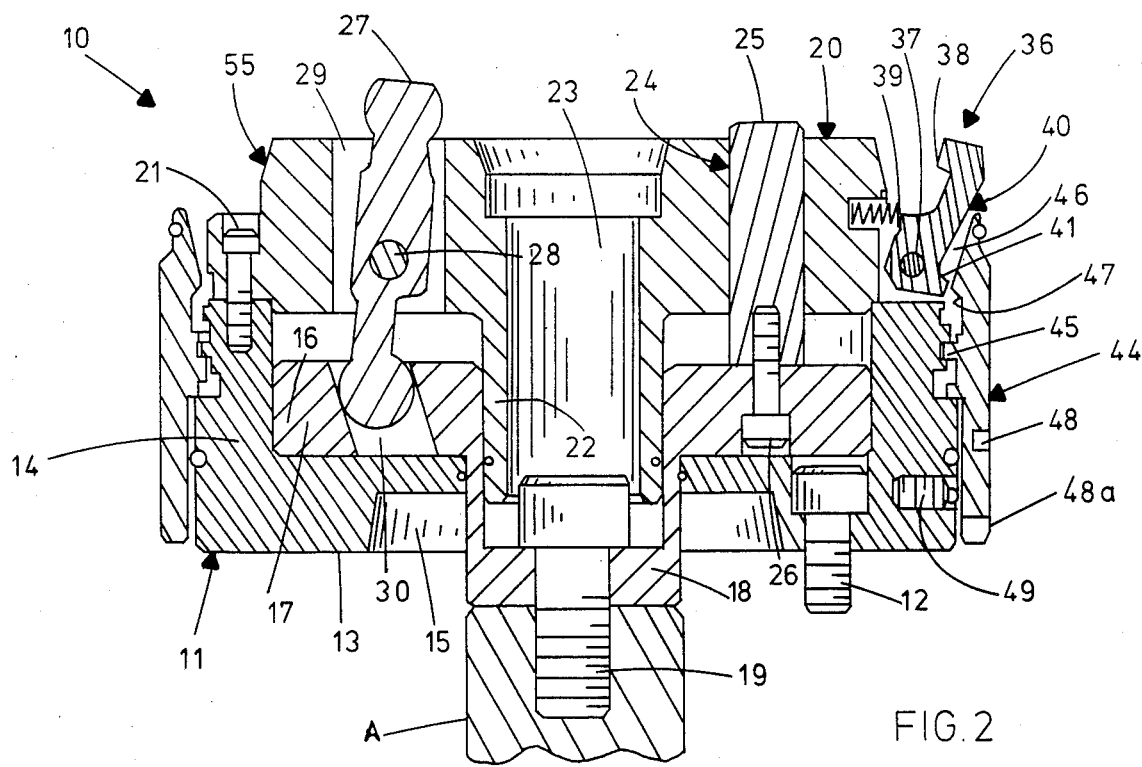
FIG. 2 is a sectional view taken along the plane II—II of FIG. 1.
Figure 4:
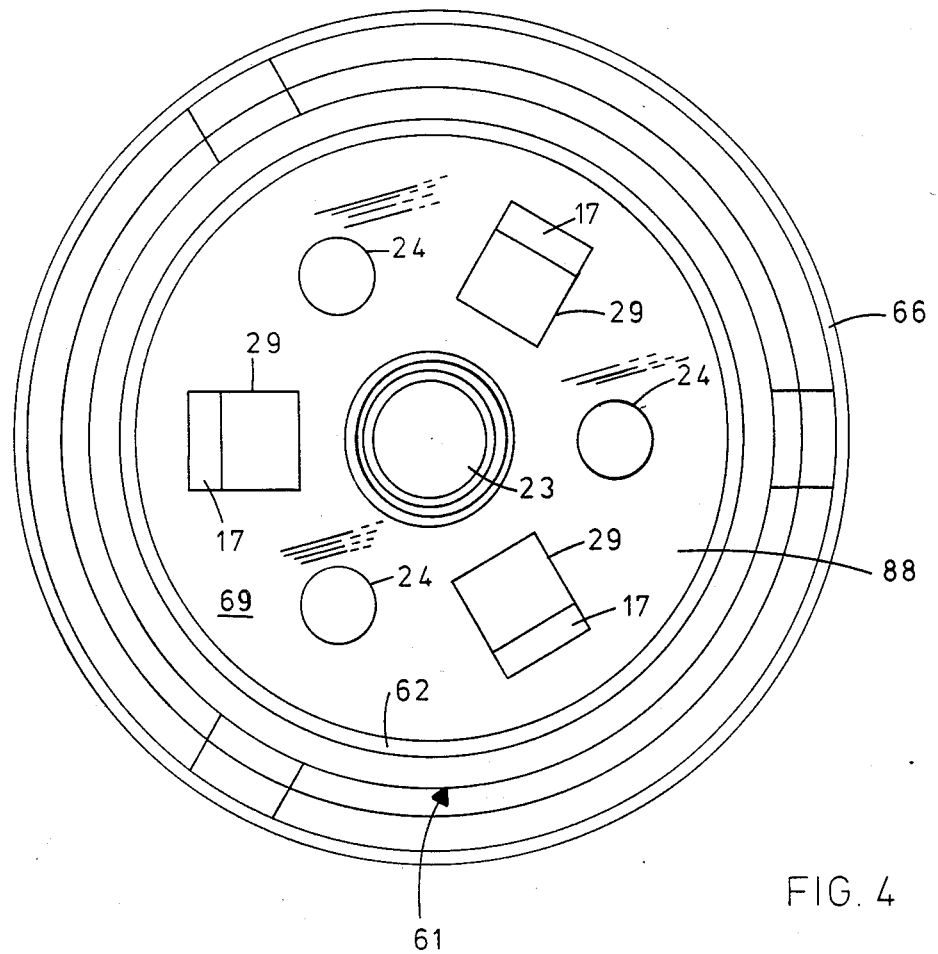
FIG. 4 is a view taken along the plane IV—IV of FIG. 7.
Figure 3:
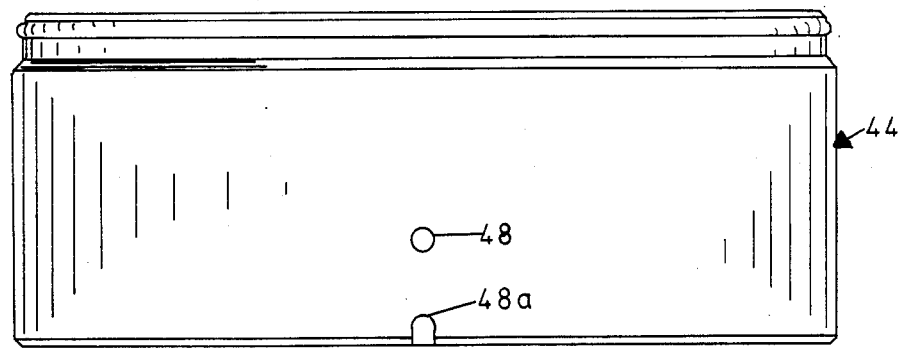
FIG. 3 is a side elevation view of the locking ring.
Figure 7:
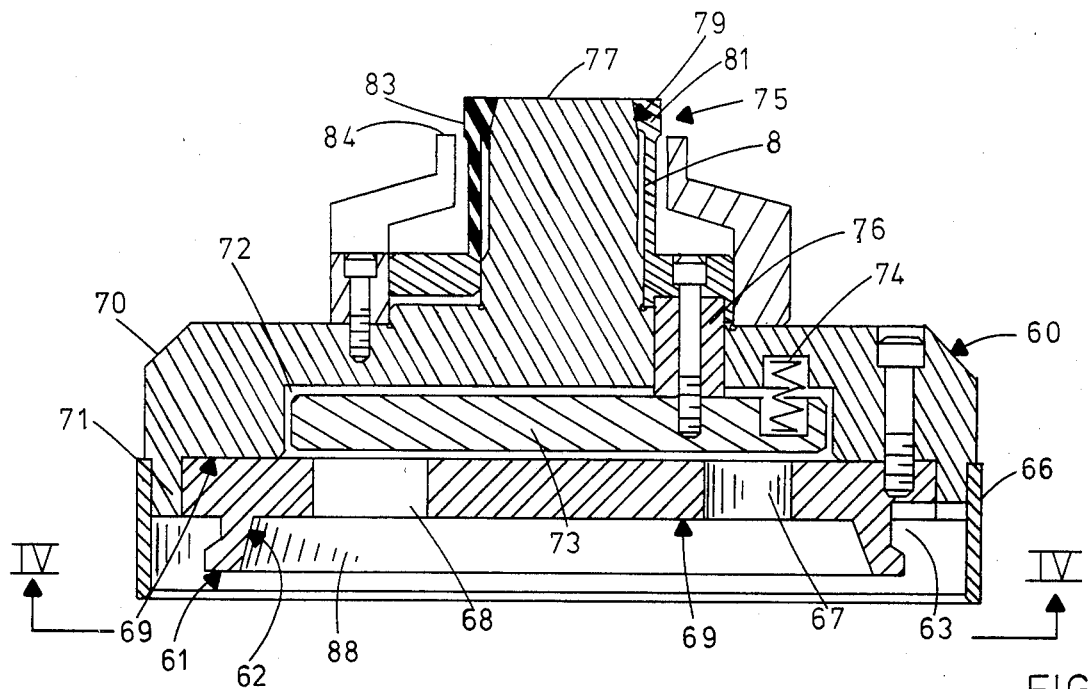
FIG. 7 is a sectional view taken along the same plane as FIG. 6 illustrating the adapter plate shown in FIG. 6 separated from its supporting chuck.

The numeral 10 refers to a support chuck having a base 11 adapted to be secured to a support such as a lathe or the like by cap screws 12 (FIG. 2). The base has a rear face plate 13 and an annular forwardly extending peripheral flange 14. The rear face of the rear face plate 13 is recessed at 15 to seat a locating boss on its support structure which serves to positively locate it concentrically of its support. The support chuck may be mounted on a spindle for rotation or on a suitable stationary support whereby it remains stationary while the tool to perform the machining is moved. The structure so far described and the means of mounting the support chuck are conventional.

Mounted within the support chuck's central chamber 16 is piston 17 having a tubular boss 18 extending rearwardly through a central opening in the rear face plate 13. The boss provides means for securing the piston to an actuator rod by means of the bolt 19.

Figure 1:
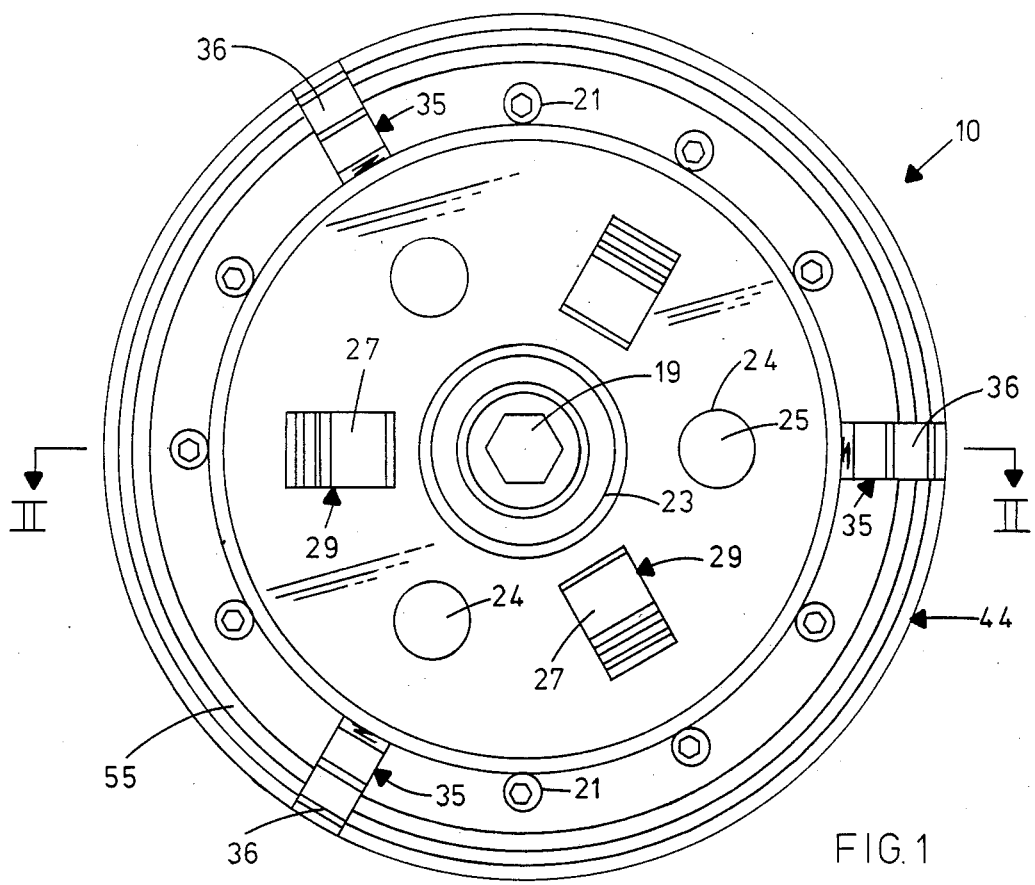
FIG. 1 is a front view of the support chuck for this invention.

The forward end of the central chamber 16 is closed by the cap 20 secured to the flange 14 by screws 21. The cap 20 has a rearwardly extending cylindrical sleeve 22 slidably seated within the central opening of the tubular boss 18. The sleeve provides a guide and stabilizer for the piston 17. The cap 20 has a central opening 23 communicating with the cylindrical sleeve providing access to the bolt 19 (FIGS. 1 and 2).

The cap 20 also has three equally spaced openings 24 to slidably receive the forwardly extending actuator posts 25 mounted to the forward face of the piston 17 by bolts 26. The forward ends of the posts project beyond the forward face of the cap. The cap also mounts three equally spaced actuator levers 27 which are supported by pins 28 on the cap for pivotal motion in a radial direction. The levers extend forwardly through the cap through elongated radial slots 29. The rearward ends of the levers are rounded to seat in the outwardly and forwardly inclined slots 30 in the piston. The forward ends of the levers are also rounded and project beyond the front face of the cap.

The forward edge of the peripheral flange is provided with three notches 35. A clamp 36 is pivotally mounted in each notch by a pivot pin 37. The clamps 36 each have a hook 38 at its forward end and is biased radially outwardly by a spring 39. The outer face of the clamp has a recess formed by a forwardly and outwardly inclined surface 40, terminating at the rearward end of the clamp at an outwardly extending projection 41.

The clamps 36 are closed by means of the locking ring 44 which surrounds and is secured to the base 11 by threads 45. The forward end of the ring is formed to provide an inner surface 46 shaped to be complementary to the outer surface 40 of the clamps. At the rearward end of the surface 46 the finger has an outwardly and rearwardly inclined camming surface 47 which engages and cooperares with the projection 41. The locking ring is extended and retracted by rotation and for this purpose a pair of tool engaging apertures 48 and 48a are provided. The tool provides the operator with leverage to rotate the ring. This also can be done by a robot in which case different and additional means of gripping the ring can be provided. When the locking ring is rotated to maximum forward position it is secured in place by suitable means such as by engagement of the detent 49 in the notch 48a (see FIG. 6). This holds it against unintended retraction.

The outer surface of the cap 20 is chamfered at 55. The angle of this chamfer and its inclination are precisely controlled because this surface controls the concentricity of the hereinafter described adapter plate with respect to the support chuck.

Figure 5:
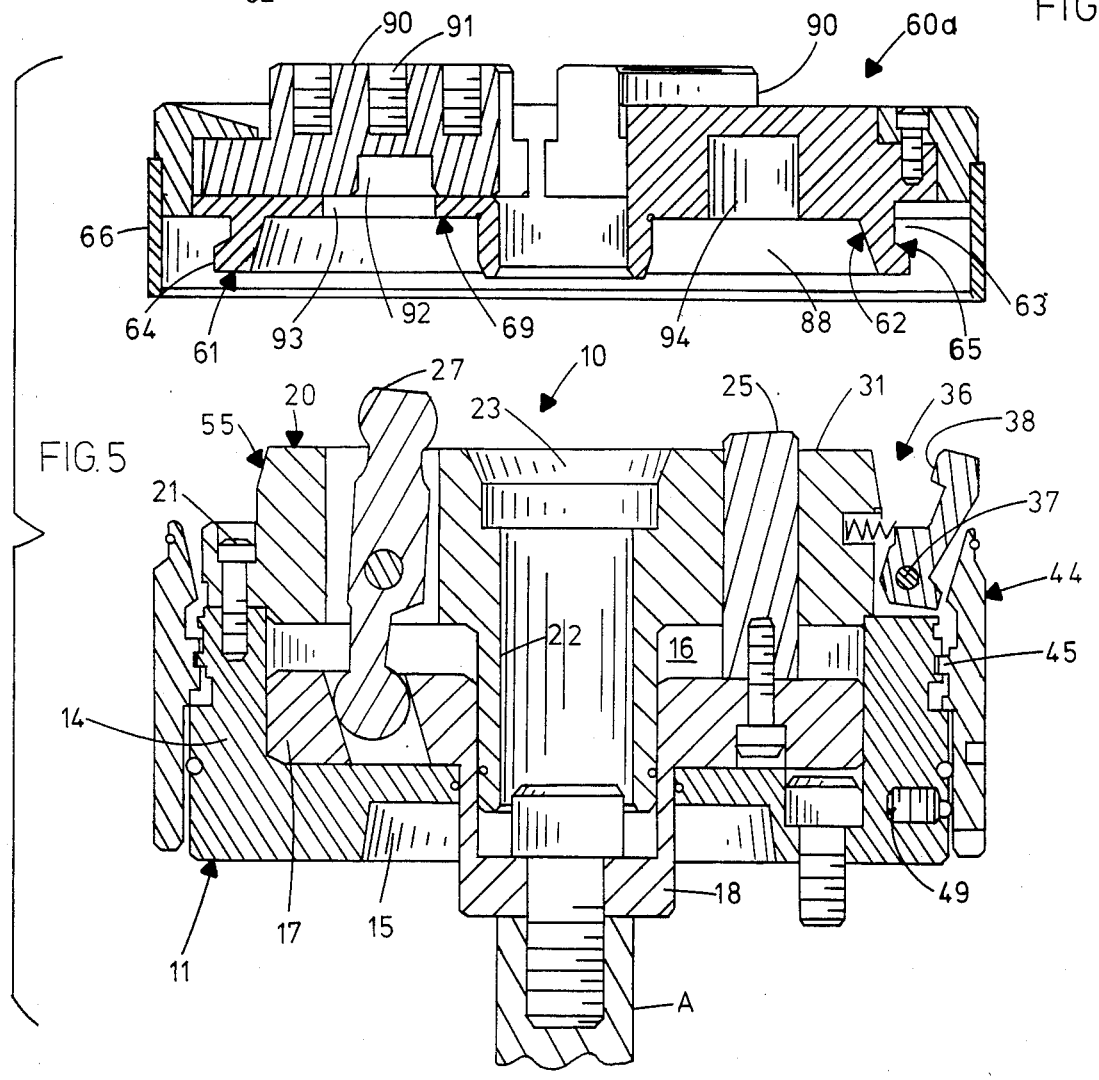
FIG. 5 is an exploded sectional view taken along the same plane as FIG. 2 illustrating the adapter plate in position for mounting.
Figure 6:
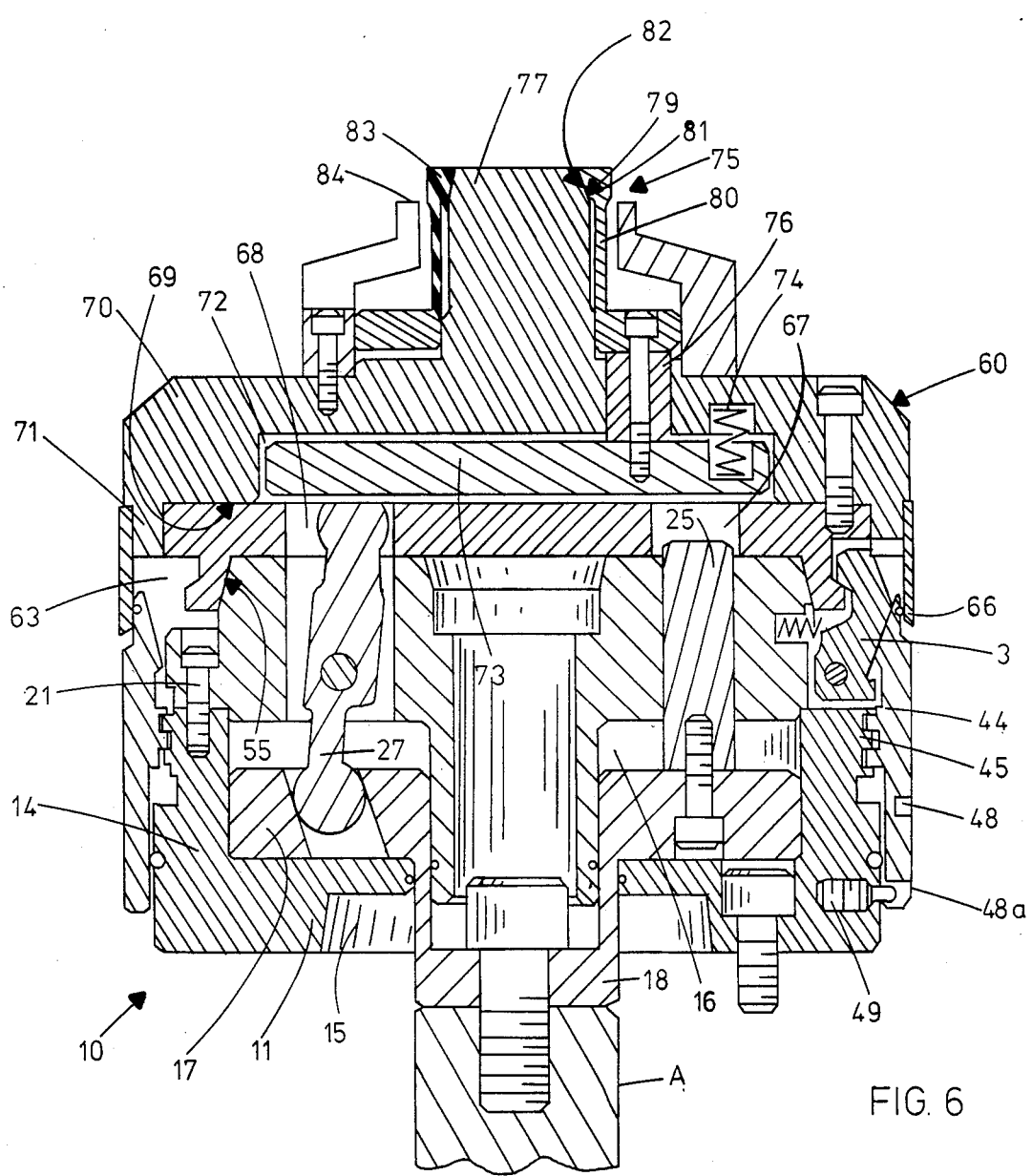
FIG. 6 is a sectional view taken along the same plane as FIGS. 2 and 5 illustrating the support chuck and adapter plate assembled.

The adapter plate 60 may have more than one construction, as will be noted from FIGS. 5 and 6. Irrespective of the adapter plate's construction, it has certain common features. One of these is the locator or anchor ring 61 (FIG. 5 and 6). The inner surface 62 of the anchor ring is inclined outwardly and rearwardly and is complementary to the chamfer 55 on cap 20. Thus, when the adapter plate is seated against the outer face of the cap 20, these complementary surfaces positively locate the adapter plate concentrically with the support chuck 10. The outer face of the anchor ring 61 has an annular recess 63 formed by the outwardly extending rib or finger 64. The forward face 65 of the finger is outwardly and rearwardly inclined and is complementary to the inclined rearwardly facing surface 42 of the clamps 36 (FIG. 5). Thus, as the clamps 36 are closed, they pull the adapter plate 60 rearwardly to seat on the forward face of the cap 20 and to positively engage the chamfered surface 55.

Both of the adapter plates 60 and 60a have a rearwardly extending peripheral skirt 66. The purpose of this skirt will be explained subsequently.

The adapter plate 60, as illustrated in FIG. 6, has holes 67 to permit posts 25 to pass through it. It also has radially extending slots 68 to receive the forward ends of the levers 27. Seated over the adapter plate 60 is a cover 70 having a rearwardly extending peripheral rim 71 which seats over the edge of the plate 60.

The cover has a rearwardly facing central recess 72 in which is located the actuator plate 73. The actuator plate is biased rearwardly by a plurality of springs 74 arranged at equally spaced intervals around the plate. The actuator plate 73 is connected to a collet 75 by a plurality of equally spaced posts 76 which extend through the cover 70. The collet surrounds the central boss 77 projecting forwardly from its center. The forward end of the central boss is chamfered at 79 and seats the inwardly inclined surfaces of the fingers of the collet. The collet is of conventional construction consisting of a plurality of fingers 80 arranged in a circle. The fingers 80 have radially enlarged heads 81, the outer faces of which contact the workpiece and the inner faces 82 of which are shaped to be complementary to and seat against the chamfer of the central boss in the manner illustrated in FIG. 6. To prevent the entrance of chips, the spaces between the fingers 80 may be filled with an elastic material 83. Surrounding the collet is a part stop or seat 84.

When the actuator A, to which the piston 17 is attached, is moved forwardly, the posts 25 are moved through the adapter plate to contact the actuator plate 73, forcing it forwardly against the springs 74. This in turn moves the ends of the collet fingers 78 beyond the end of the central pin 77, permitting them to converge due to their built in spring bias to do so. This permits a workpiece to be seated on the stops 84 and by retracting the central boss, the fingers of the collet are expanded to grip the part.

In the adapter plate construction illustrated in FIG. 6 the thickness of the plate is such that the forward ends of the levers 27 do not contact the actuator plate 73 because in this construction the levers perform no function. This is necessary since the levers are not used when an I.D. collet is employed as the workpiece grip.

FIG. 5 illustrates an adapter plate 60a incorporating exactly the same structure for attaching it to support chuck 10. However, in this case the adapter plate mounts three radially movable jaw supports 90, one aligned with each of the levers 27. Each of the jaw supports is bored and threaded at 91 to mount the actual part engaging jaw. The jaw supports are recessed into the face of the adapter plate in a manner conventional in chuck construction. The bottom face of each jaw is recessed at 92 to form a pocket which receives the end of one of the levers 27. The adapter plate 60a has radial slots 93 to permit free movement of the levers. As the piston is moved forwardly the levers 27 are rocked to open the jaws and when the piston is retracted the levers are moved to close the jaws, gripping the part. Recesses 94 are provided to receive the posts 25, since in this construction, they are not functional except as stabilizing guides for the piston 17.

Figure 8:
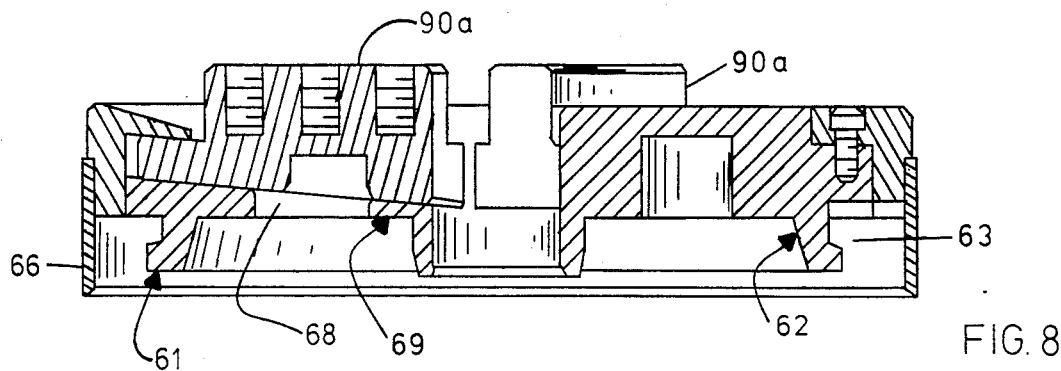
FIG. 8 is a sectional view taken along the same plana as FIG. 5 illustrating a modification of the mounting for the jaws.

FIG. 8 illustrates an adapter plate 60b which is a modification of the adapter plate illustrated in FIG. 5. In this construction the guideways for the jaw supports 90a are inclined inwardly and rearwardly at a small angle such as 3-5 degrees. Thus, as the jaws are closed they apply a small rearward force to the workpiece drawing it back against any work stop which has been provided. This elimnates any forward movement which might have been imparted to the workpiece as a result of tolerance accumulation or wear in the jaw supports 90a and their guideways.

Figure 9:
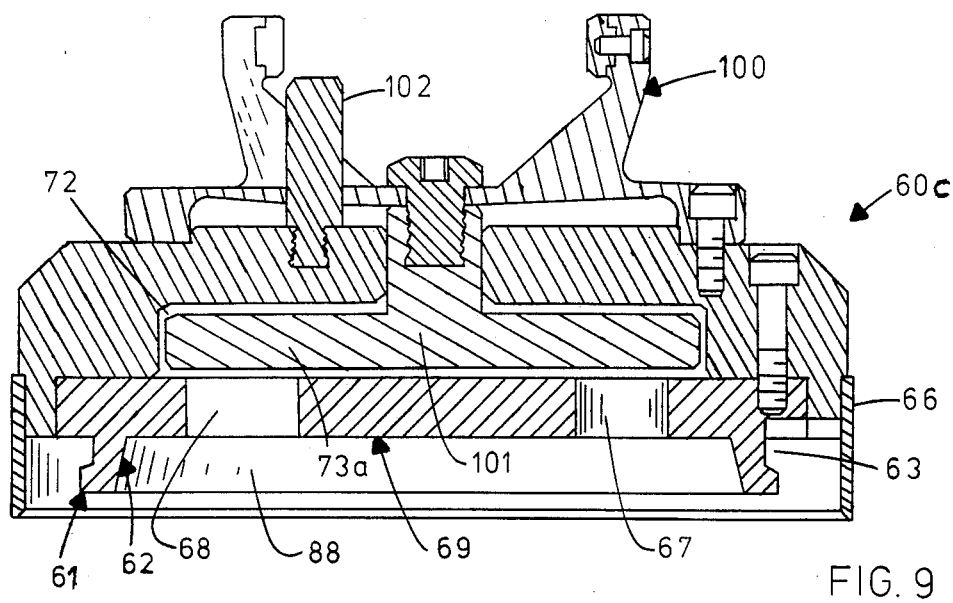
FIG. 9 is a sectional view taken along the same plane as FIGS. 2 and 5 illustrating the adapter plate equipped with an O.D. grip diaphragm chuck.

FIG. 9 illustrates an adapter plate 60c equipped with an O.D. grip chuck 100. The construction of the plate 60c is substantially identical to the plate 60, having a cover 70a with a central recess 72 within which is an actuator plate 73a. The actuator plate has a central post 101 extending through the cover 70a and attached to the center of the diaphragm chuck 100. Stops 102 are provided to seat the workpiece. Using the actuator posts 25 of a support chuck 10 such as illustrated in FIG. 2, the actuator plate 101 is pushed forwardly to open the jaws 10 of the diaphragm chuck 100.

Figure 10:
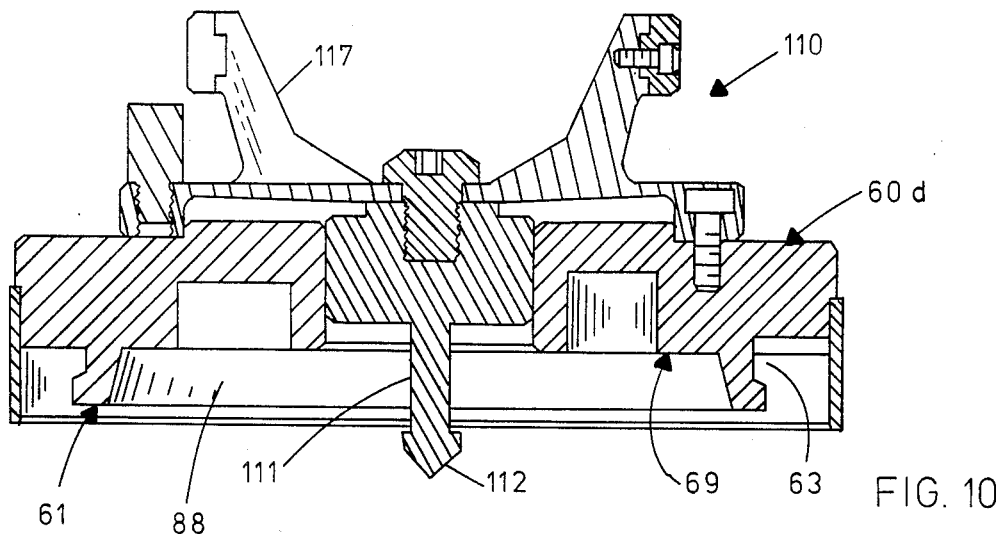
FIG. 10 is a sectional view taken along the same plane as FIGS. 2 and 5 illustrating the adapter plate equipped with an I.D. grip diaphragm chuck.
Figure 11:
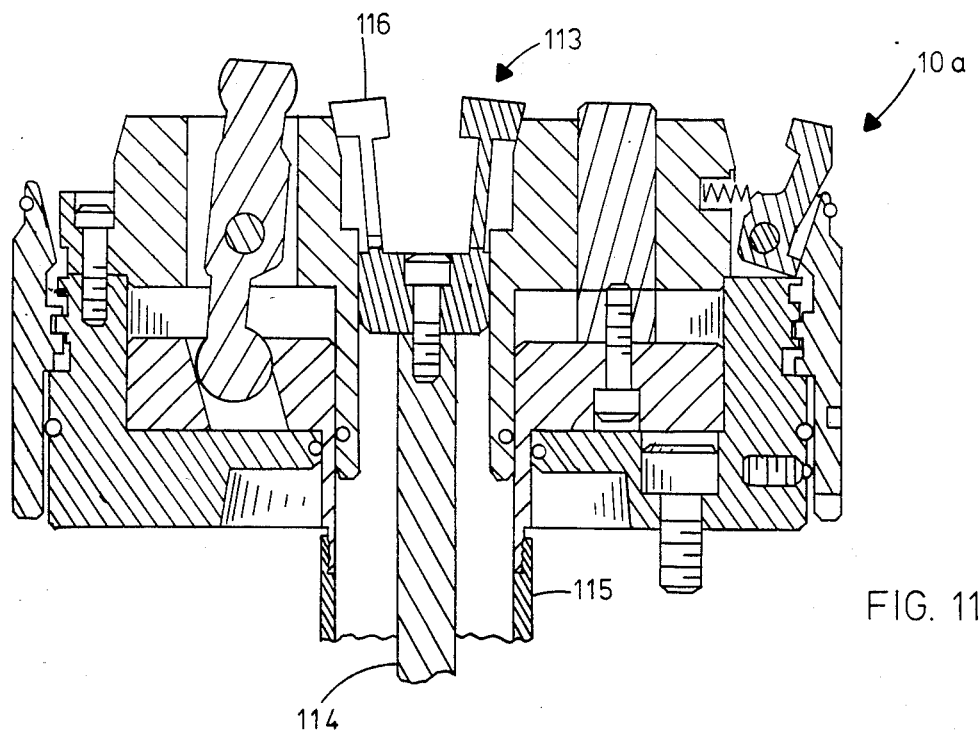
FIG. 11 is a sectional view taken along the same plane as FIG. 2 illustrating a support chuck suitable for operating the adapter plate and chuck illustrated in FIG. 10.

FIG. 10 illustrates an adapter plate 60d equipped with an I.D. diaphragm chuck 110. In this construction the cover is eliminated and the chuck 110 is mounted on the forward face of the plate 60d. The adapter plate 60d has a central opening through which extends the actuator pin 111. The pin 111 is secured to the center of the chuck 110. The pin 111 has an enlarged rear head 112 by which it can be gripped by the collet type clamp 113 of the support chuck 10a. The clamp 113 is moved axially by means of the rod 114 which is telescoped through the actuator tube 115 of the support chuck. When the clamp 113 is in its forward position as illustrated in FIG. 11 its jaws 116 open due to resilience. As the clamp is pulled rearwardly the jaws are forced to close about the head 112 of the pin due to the conical shape of the opening in the support chuck into which the clamp is drawn. the pull exerted on the pin deflects the diaghragm sufficiently to cause the jaws 117 to retract. Except for the rod 114 and the clamp 113, the use of the adapter plate 60d and the diaphragm chuck 110 requires no modification of the support chuck used for the other types of workpiece gripping means. The use of the tube 115 could be substituted for the rod A illustrated in FIGS. 2, 5 and 6 in all cases. It will be noted that using this construction the same support chuck can be used with any of the various types of workpiece gripping chucks, thus, giving it a universal function.

In the case of all of the adapter plates 60, 60a, 60b, 60c and 60d the construction of the anchor ring 61 remains identical. Also the rear surface 69 of the adapter plate within the anchor ring is flat and recessed within the anchor ring. Also, the size, shape and depth of the recess 88 within the anchor ring remains identical. It will be observed from FIGS. 2, 5, 6 and 11 that the front surface 31 of the support chuck is also flat. Thus, while the inner surface 62 of the anchor ring and the chamfer 55. on the support chuck control concentricity of the adapter plate, the surface to surface contact between the surfaces 31 and 69 controls the axial position of the adapter plate. Because these surfaces are critical to accuracy, these surfaces are finished by grinding on hardened masters to very close tolerances. In fact, the permissible tolerances are such that cutting reliefs in these surfaces is advisable to lessen the problem of molecular adhesion.

FIGS. 5, 6, 8, 9 and 10 are only illustrative of the types of work holding devices which can be mounted on an adapter plate. Further, instead of mechanically operating the chuck mounted on the adapter plate, air operation could be substituted.

The skirt 66 serves as a sealing device by seating over the forward end of the locking ring 44 when the adapter plate and support chuck are mounted for operation. By overlapping and seating against the forward end of the ring, the skirt holds the ring against any type of movement due to centrifugal forces. It also cooperates with the O-ring 98 to seal the interior of the support chuck/adapter plate assembly against the entrance of chips and particles which might cause misalignment between the adapter plate and the support chuck.

This invention permits a machine equipped with a standard chuck to be refitted to adapt it to machine a part of a different size by detaching the adapter plate and its work holder and replacing it with another work holder equipped with a chuck of the proper size and type for the part. This is a very simple and rapidly accomplished changeover. It also makes it feasible to perform all of steps necessary to complete a particular machining operation on a particular part. For example, a particular opening may require boring, reaming and finally honing. Each successive operation requires a progressively higher degree of accuracy. For this purpose the required chuck should be changed such as using first a sliding jaw chuck then a collet and finally a diaphragm chuck. Heretofore, because of the labor and downtime required to change chucks it has been necessary to mount these chucks on three different machines, an inefficient utilization of equipment unless long, high volume production runs were involved. Utilizing this invention, a single machine can be used with only a few minutes required to complete all necessary changes. Further, all of these changes can be made entirely automatically by means of robots, a capability not previously attained for this phase of tooling.

Another advantage of the invention is that each adapter plate can be prebalanced to accomodate irregularly shaped parts which would result in an eccentric weight distribution. This can be done in such a manner that when the use of the adapter plate for the particular part is complete or suspended for a while, the counterbalances can be removed or replaced with different ones as needed.

There is no time consuming mounting and remounting of chucks as heretofore has been required. There is no necessity for gauging and checking the substituted adapter plate chuck for accuracy because the engagement between the adapter plate and the support chuck automatically locates the adapter plate with respect to the support chuck and the position of the workpiece gripped in the chuck on the adapter plate is automatically coordinated with the support chuck.

The adapter plate and its chuck can be stored for future use. Thus, the use of precision machining techniques for parts is made feasible for parts which have small production runs or may be used in small quantities over a long period of time such as years. The investment in the adapter plate and its chuck is small enough to permit this. Further, the downtime for converting the machine is reduced to minutes rather than hours. There is also a major reduction in labor costs.

The recessing of the anchor ring 61 from the periphery of the adapter plate affords a substantial degree of protection for this ring during handling. This is important because the ring is vital to the accurate positioning of the ring. The accuracy of the ring is further protected by the fact that the critical surfaces are recessed within the ring and, therefore, are not affected by wear, scratching or nicking of the ring which might be done by surfaces on which the plate is placed during storage or handling.

The invention also permits the machines to be equipped with chucks of a single size, or in a large shop, of at least only a few sizes. This in itself is a major economy. It also makes the machines interchangeable whereby machines can be quickly adapted to machining parts then in demand rather than being left idle because they are not suited for mounting chucks of a type required to machine the particular parts needed.

These benefits are obtained while at the same time providing a system capable of significantly improved tolerance control. This invention permits repeatable workpiece positioning within ±0.00015 of an inoh, repeatable concentricity within 0.0002 to 0.00035 of an inch and repeatable axial positioning with ±0.00005 of an inch. This is possible because the invention makes it possible to take advantage of the high degree of accuracy characteristic of heavy duty, precision chucks.

It will be recognized that by utilizing this invention a support chuck can be substituted for the conventional workpiece holder used with various machine tools. While some machining cannot be carried out utilizing this invention, conventional operations can utilize the invention. The adapter plate can be used both as a moving and as a stationary support.

The construction of the support chuck is not limited to the type described and illustrated. Support chucks of other constructions can be utilized provided they are capable of sustaining the types of loading incident to use of this invention and are capable of positively aligning the adapter plate with the chuck's centerline. Examples of chuck operating mechanisms which can be utilized in the support chuck of this invention are disclosed in U.S. Pat. No. 3,858,893 issued Jan. 7, 1975 to G. J. Ovanin, U.S. Pat. No. 2,794,648 issued June 4, 1957 to M. B. Sampson. These chucks are of the automatic, self-centering type. Another construction useable in the support chuck, particularly when high speed operation is required, is disclosed in U.S. Pat. No. 3,771,804 issued Nov. 13, 1973 to W. G. Pratt. While each of these chuck construct:ons may require at least minor modification to adapt it to this invention, the fundamental construction and functions will remain.

While a preferred embodiment of this invention and a modification thereof have been illustrated and described other modifications can be made without departing from the principles of this invention. Such modifications are to be considered included within the hereinafter appended claims unless these claims by their language expressly state otherwise.

We claim:

1. Means for mounting a work holding assembly on a support element in preparation for machining, said means comprising: a support member adapted to be mounted on said support element, said support member having parallel front and back faces normal to a central axis thereof; a plate member having front and back faces normal to said central axis, the front face of said plate member being adapted to mount the work holding assembly; said support member having a frusto-conical boss concentric with said central axis said plate member having a recess concentric with said central axis and of a size and shape to snugly receive said boss therein for automatically rendering said plate and support members concentric with each other when the rear face of said plate member is seated against the front face of said support member; a plurality of latch elements mounted on said support member for reciprocal radial movement; said plate member having latch element engaging means aligned with said latch elements; a locking ring mounted on and surrounding said support member and operatively connected to said latch elements for shifting said latch elements radially between latched and release positions in response to movement of said ring relative to said support member for connecting and disconnecting said plate member to and from said support member.

2. The means for mounting a work holding assembly on a support element as described in claim 1 wherein the locking ring moves axially for shifting said latch means.

3. The means for mounting a work holding assembly on a support element as described in claim 2 wherein said locking ring is internally threaded and threadedly engages said support member.

4. The means for mounting a work holding assembly on a support element as described in claim 2 wherein said locking ring has a cam surface engaging said latch elements.

5. The means for mounting a work holding assembly on a support element as described in any one of claims 1, 2, 3 or 4 wherein a central opening is provided through both said support and plate members for a power actuable means movable with respect to both said support and plate members for actuating a work holding assembly mounted on the front face of said plate member.

6. The means for mounting a work holding assembly on a support element as described in claim 1 wherein said plate member has a rearwardly extending support means arranged in an annular shape, an inner face of which forms said concentric recess and an outer face has recessed therein said latch element engaging means, said latch elements being fingers pivotally mounted to said support member; said locking ring having a cam surface, each of said latch elements having a radial outer surface engaged by the cam surface of said locking ring for pivotal radial inward movement to engage said latch element engaging means in the outer face of said rearwardly extending support means.

7. The means for mounting a work holding assembly on a support element as described in any one of claims 1 through 4 wherein said latch element engaging means is a rearwardly projecting annulus integral with the rear face of said plate member and a radially outwardly facing channel in a circumferential face of said annulus into which the latch elements engage.

8. The means for mounting a work holding assembly on a support element as described in claim 6 wherein said latch element engaging means is a channel and a rear wall of said channel is rearwardly and radially outwardly inclined to form a cam surface and the forward ends of said fingers each have a complementary cam surface whereby said fingers as they pivot radially inwardly pull said plate member tightly against the front face of said support member.

9. The means for mounting a work holding assembly on a support element as described in claim 2 wherein said latch elements are pivotally mounted, resilient means urging said latch elements radially outwardly to said release position.

10. The means for mounting a work holding assembly on a support element as described in claim 1 wherein lock means are provided for engaging said locking member for holding it against movement when said locking member has shifted said latch elements to said latched position.

11. Means for mounting an article holding assembly on a support element in preparation for machining as described in claim 1 wherein said latch element engaging means is a peripheral groove in said boss, a radially outwardly projecting rib forming a radially extending wall defining an axial end of the recess remote from said other face, said wall being inclined radially outwardly and away from said other face; said latch elements having a camming surface inclined to be complementary to said inclined wall for effecting a camming engagement with the radially extending wall.

12. Means for holding a workpiece with reference to a central axis serving as a reference for positioning the workpiece with respect to means for machining the workpiece during machining operations, said means including a support chuck having an axis concentric with said central axis and having a front face, portions of which are flat and in a plane perpendicular to the axis of said support chuck, a plurality of radially movable clamping elements mounted on said support chuck, said support chuck being adapted to be mounted on a support element capable of precisely locating the central axis of the support chuck; a plate having a pair of faces in axially spaced parallel planes and an axis passing through the geometric center of the plate perpendicularly to said planes of said faces, anchor means projecting rearwardly from one face of said plate positioned for engagement by the clamping elements of the support chuck; said anchor means having a circular configuration concentric with said axis and a peripheral recess for receiving and seating the clamping elements of said support chuck for pulling the rearward face of said plate tightly against said front face of said support chuck to position the plate axially; locator means having telescopically interfitting frusto-conical portions on both said support chuck and said plate, of which said anchor means is one of the portions for holding the axes of said plate and support chuck concentric with each other; means rotatably mounted on and surrounding said support chuck engaging said clamping elements for shifting them radially between plate clamping and release positions; a plurality of workpiece gripping elements mounted on the forward face of said plate.

13. The means for holding a workpiece during machining as described in claim 12 wherein said anchor means is an annulus with said recess being located in its radially outer face.

14. Means for holding a workpiece during machining as described in claim 12 wherein said gripping elements are movable between workpiece clamping and release positions; the center of both said support chuck and said plate having aligned apertures to provide a passage therethrough for an actuator for shifting said gripping elements between said workpiece clamping and release positions.

15. The means for holding a workpiece as described in claim 12 wherein said clamping elements and a forward end of said rotatable means have complementary camming surfaces for shifting said clamping elements into wedging engagement with said anchor means.

16. The means for holding a workpiece as described in claim 14 wherein a spring is provided for each of said clamping elements, said springs urging said clamping elements into said plate release position.

17. Means for holding a workpiece during machining, said means being a plate mountable on any support having a self-centering support chuck equipped with radially movable elements adapted to grip the plate, said plate having front and back parallel surfaces, an anchor means extending rearwardly from the back surface of said plate, said anchor means being arranged in a circle concentric with a central axis of said plate, said anchor means including recess means for engagement by the support chuck elements and a surface arranged in a circle concentric with said central axis, said surface being inclined to the central axis of the plate for engagement with a complementary surface on the support chuck for arranging said plate concentrically with said support chuck; a central opening through said plate for passage of an actuator therethrough for manipulating any workpiece engaging means mounted on the front face of said plate.

18. Means for holding a workpiece during machining operations, said means comprising a support chuck having a central axis, a plate having a primary axis and a manipulate workpiece gripping member mounted on said plate, radially movable plate engaging elements mounted on said support chuck; said plate having front and back parallel surfaces normal to said plate's primary axis, an anchor means extending rearwardly from the back surface of said plate, said anchor means including recess means for penetration by and seating of said plate engaging elements for detachably locking said plate and support chuck together and a first alignment surface arranged in a circle concentric with said primary axis of said plate, said first surface being inclined to the central axis of the plate; said support chuck having a second circular alignment surface thereon concentric with said central axis of said support chuck facing toward said plate and of a shape complementary to that of said first alignment surface for interfitting and mating therewith for effecting concentric alignment between said plate and support chuck; a central opening through both said support chuck and said plate providing passage for an actuator therethrough for manipulation of said gripping element between closed and open positions.

19. The means for holding a workpiece as described in claim 18 wherein said anchor element is an annulus and said radially extending recess means is a channel in the radial outer face of said anchor element.

20. The means for holding a workpiece as described in claim 18 wherein said workpiece gripping member is a sliding jaw chuck.

21. The means for holding a workpiece as described in claim 18 wherein said workpiece gripping member is a diaphragm chuck.

22. The means for holding a workpiece as described in claim 18 wherein said workpiece gripping member is a collet.

* * * * *